United States Patent

[11] 3,576,336

[72] Inventors Edwin C. Uhlig deceased
South Bend, Ind.;
Doris L. Uhlig, Administratrix,
Wallingford, Conn.
[21] Appl. No. 878,047
[22] Filed Nov. 19, 1969
[45] Patented Apr. 27, 1971
[73] Assignee Uniroyal, Inc.
New York, N.Y.

[54] FORCE TRANSMITTING SYSTEM
19 Claims, 9 Drawing Figs.
[52] U.S. Cl. ................................................. 287/124,
279/2, 287/53
[51] Int. Cl. .................................................. F16d 1/06
[50] Field of Search ........................................... 287/124,
114, 53, 2; 279/2; 64/(Inquired)

[56] References Cited
UNITED STATES PATENTS

| | | | |
|---|---|---|---|
| 291,282 | 1/1884 | Blue | 279/2 |
| 1,706,973 | 3/1929 | Zagorski | 287/114X |
| 2,308,542 | 1/1943 | Raybould | 287/114 |
| 2,446,406 | 8/1948 | Byerle | 287/124X |
| 2,816,769 | 12/1957 | Noble | 287/114X |
| 3,069,762 | 12/1962 | Sonnier | 279/2X |

FOREIGN PATENTS

| | | | |
|---|---|---|---|
| 122,971 | 2/1919 | Great Britain | 279/2 |

Primary Examiner—David J. Williamowsky
Assistant Examiner—Andrew V. Kundrat
Attorney—Norbert P. Holler ABSTRACT: A force transmitting system including a cylindrical fiber-reinforced resin tube to which stress is transferred simultaneously via both the outside and inside surfaces of the tube, is disclosed. The system utilizes a drivable fitting which includes an external rigid coupling sleeve and an internal radially expansible circumferential arrangement of elongated wedge elements, defining between the former and the latter an annular space in which one end region of the tube wall can be received and radially clamped. Distribution of stress transfer over the entire clamped portion of the tube is provided for by means of a pair of substantially coextensive, circumferentially continuous layers of elastomeric material overlying the outside and inside tube surfaces, respectively, the outer elastomer layer being of uniform thickness throughout its expanse, and the inner elastomer layer increasing in thickness in the direction away from the open tube end to match the increase in the width of the space defined between the inner tube surface and the outer surface of the set of tapering wedge elements.

The foregoing abstract is not to be taken either as a complete exposition or as a limitation of the present invention, and in order to understand the full nature and extent of the technical disclosure of this application, reference must be had to the following detailed description and the accompanying drawings as well as to the claims.

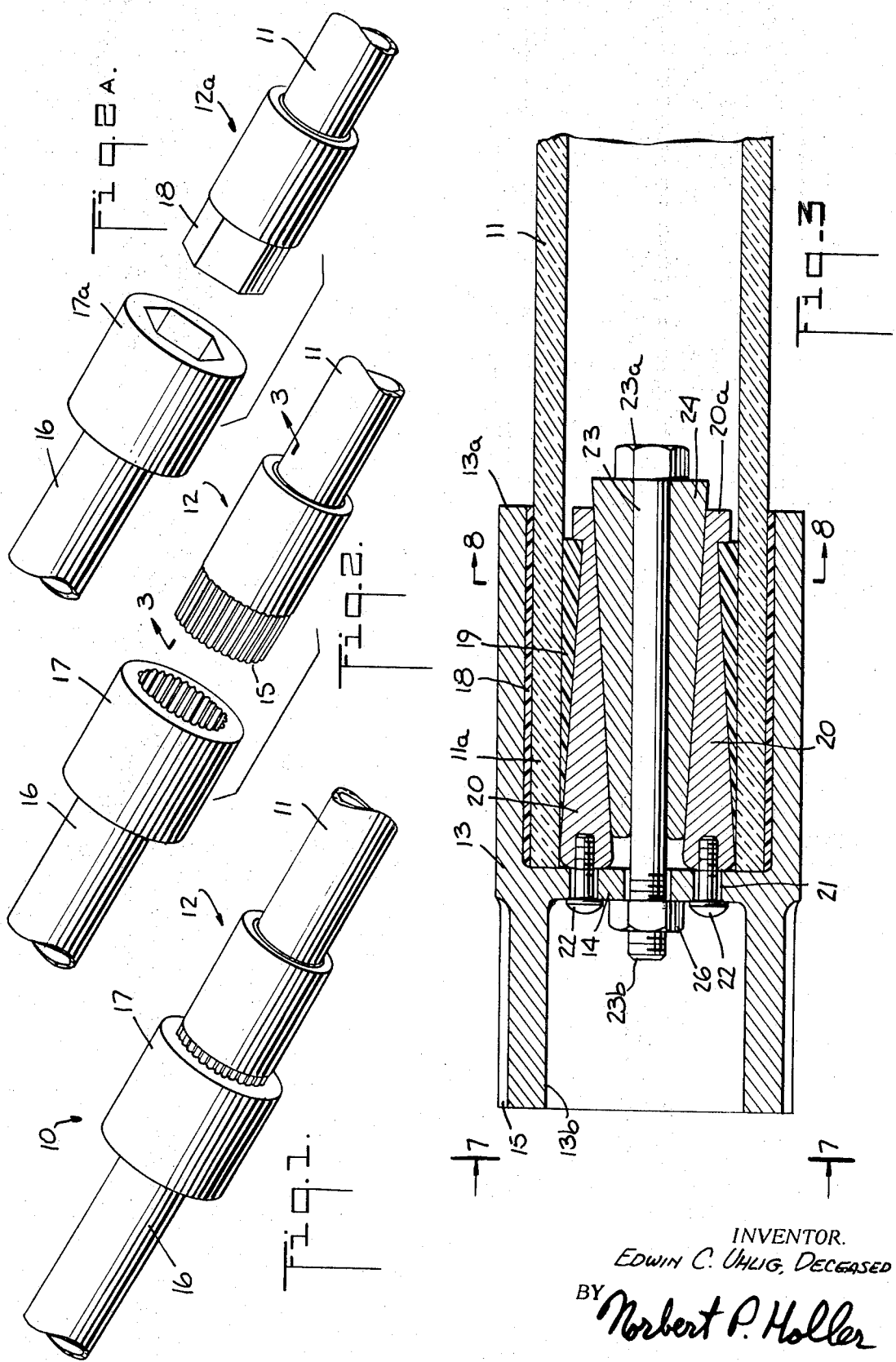

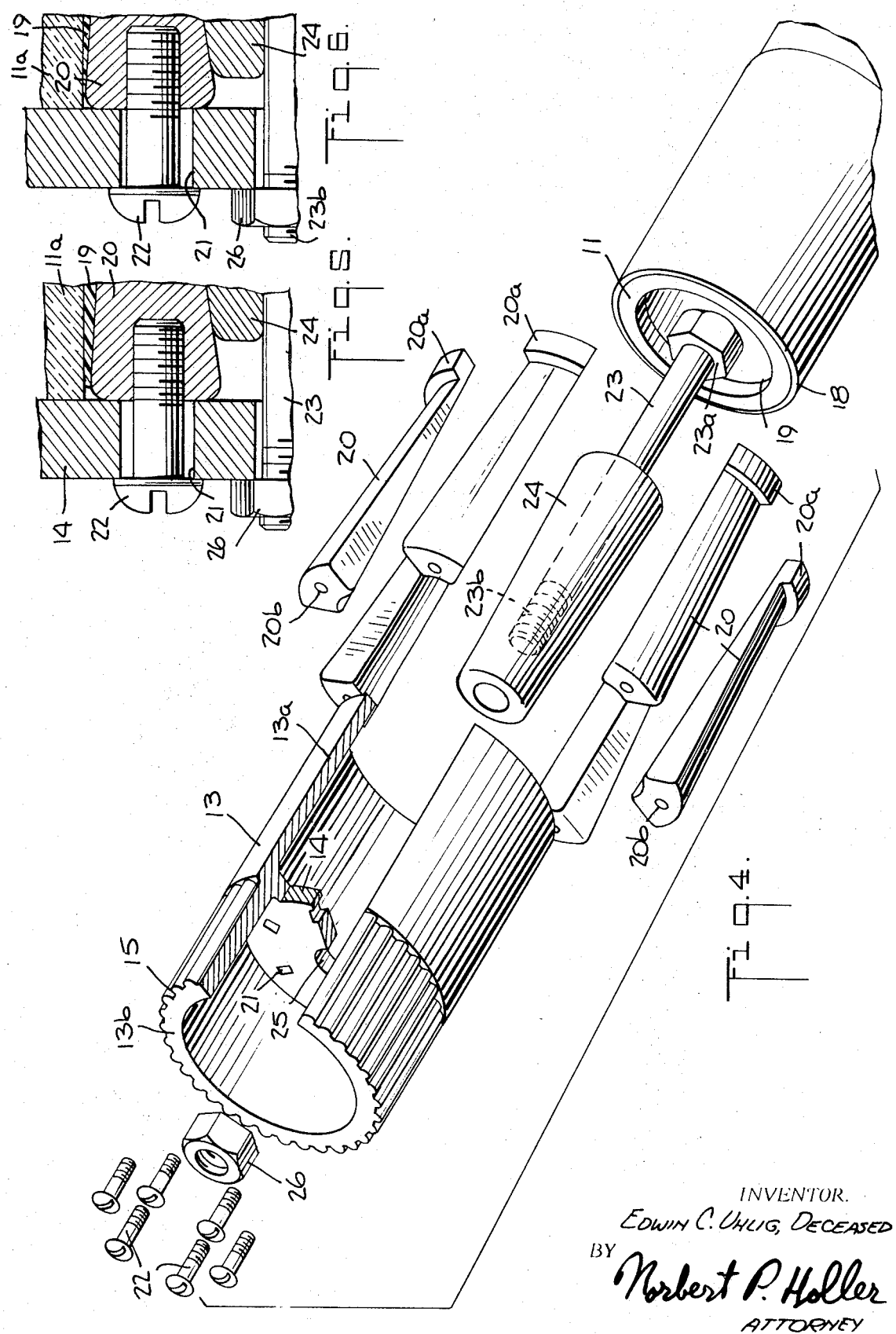

INVENTOR.
EDWIN C. UHLIG, DECEASED
BY
Norbert P. Holler
ATTORNEY

FORCE TRANSMITTING SYSTEM

This invention relates to force transmitting systems utilizing elongated cylindrical tubes of fiber-reinforced resin. As used herein, the term "fiber-reinforced" is intended to designate both filament-wound and fiber-filled as well as fabric-reinforced resin structures.

Although the use of metallic bars, rods and tubes as force transmitting members is well known, the use of such members made of fiber-reinforced resin may be highly desirable in a number of applications, for example if reducing the weight of the force transmitting member without adversely affecting its strength is an important consideration. Especially in the case of reinforced resin tubes, however, problems have been encountered in effecting a positive connection of the driving member to such a tube, and in preventing failure of the tube in the region of the connection under the applied stresses. Also, a resin tube requires a distribution of the applied stresses over a much larger area of the tube surface than does a metal tube.

It is an object of the present invention, therefore, to provide a novel force transmitting system utilizing a cylindrical fiber-reinforced resin tube as the force transmitting member, wherein the aforesaid problems are effectively overcome.

It is also an object of the present invention to provide a novel type of tube clamping device or fitting for use in such a force transmitting system as the means for connecting the fiber-reinforced resin tube to the power source.

Generally speaking, the present invention provides a force transmitting system characterized by the inclusion of a drivable fitting by which the force to be transmitted is transferred to the cylindrical fiber-reinforced resin tube simultaneously from both the outside and inside surfaces of the tube. The fitting, which is designed to be radially clamped to one end region of the tube over the entire expanse of said region, includes an external rigid metal dual section coupling sleeve and an internal radially expansible circumferential arrangement of elongated wedge elements disposed in one of the sections, an annular space thereby being defined about the wedge elements to receive the tube end region. The coupling sleeve intermediate its ends has an internal transverse web which defines the sections of the sleeve and bridges the open end of the tube, and the wedge elements, which taper in thickness in the direction away from the web, are independently secured at their thickest ends to the web for a limited degree of radial movement. A conical draw rod located in the correspondingly shaped space defined within the confines of the arrangement of wedge elements and activatable from the remote face of the web, serves to effect the outward displacement of the wedge elements required for the clamping action. The other section of the coupling sleeve is externally hexagonal, splined or otherwise arranged to provide for a positive driving connection of a correspondingly constructed output member or force applying means of a power source to the coupling sleeve. Distribution of stress transfer over the entire length of the clamping portion of the fitting is achieved by means of a pair of substantially coextensive, circumferentially continuous layers of elastomeric material bonded to the outside and inside tube surfaces, respectively, the outer elastomer layer being of uniform thickness throughout its expanse, and the inner elastomer layer having a wall thickness which increases in the direction away from the web and being confined in the correspondingly shaped space defined between the tube and the arrangement of wedge elements.

The foregoing and other objects, characteristics and advantages of the present invention will be more clearly understood from the following detailed description thereof when read in conjunction with the accompanying drawings, in which:

FIG. 1 is a fragmentary perspective view of a force transmitting system of the type referred to and shows a drive member coupled to a fiber-reinforced resin tube by means of a force transferring fitting according to the present invention;

FIG. 2 is an exploded fragmentary perspective view of the force transmitting system shown in FIG. 1 and illustrates the exterior configuration of the fitting;

FIG. 2a is a view similar to FIG. 2 of a force transmitting system having a somewhat modified exterior configuration of the fitting;

FIG. 3 is a fragmentary sectional view taken along the line 3-3 in FIG. 2;

FIG. 4 is an exploded perspective elevational view of the structure shown in FIG. 3;

FIGS. 5 and 6 are fragmentary sectional views, drawn to an enlarged scale, of a portion of the structure shown in FIG. 3 and illustrate different operational stages of the wedge elements constituting a part of the fitting;

Figure 7:
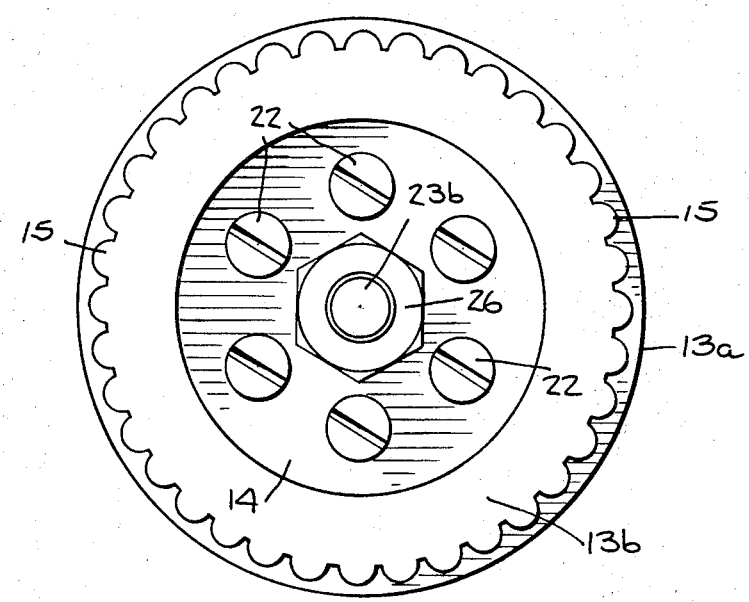
FIG. 7 is an end elevational view of the fitting, the view being taken along the line 7-7 in FIG. 3.

Although the present invention is of general utility insofar as the transmission of forces is concerned, for the sake of simplicity the following description will in the main concern itself with a torque transmission system designed for use in a variety of applications such as land vehicles, including tanks, trucks and automobiles, aircraft, various types of machinery, and the like, where the use of torsion bars is required.

Referring now to the drawings in greater detail, the torque transmitting system 10 according to the basic principles of the present invention as shown in FIGS. 1 and 2 comprises a fiber-reinforced resin torsion tube 11 (for example a filament-wound glass fiber and epoxy resin tube, with the reinforcement being omitted from the drawings for the sake of clarity) and a fitting 12 clamped, in a manner to be more fully described presently, to one end region of the torsion tube 11. The fitting 12 comprises a dual-section rigid metal tubular coupling sleeve 13 (FIGS. 3 and 4) which is provided with an internal transverse web 14. The section 13a of the coupling sleeve to one side of the web 14 constitutes a part of the tube-clamping portion of the fitting. The section 13b of the coupling sleeve extending to the other side of the web 14 is shown as being provided with an external series of axial splines 15 so as to provide for a positive driving connection of a drive member 16, e.g. a shaft or axle connected with the main power source (not shown), to the fitting by means of a correspondingly internally splined socket-shaped extension 17 of the member 16.

It will, of course, be understood that such connection may be effected by other and equivalent means, for example by the provision of a fitting 12a (FIG. 2a) wherein the section of the coupling sleeve intended for connection to the power source is externally hexagonally shaped, as shown at 18, to coact with an internally hexagonal socket 17a of the drive member 16, or by the socket portion of the drive member being locked to the fitting, in a manner not explicitly illustrated, by means of bolts, pin and slot connections, etc. Other than in the interlocking feature, however, the fitting 12a (and likewise any other equivalent fitting) is identical to the fitting 12, and the following detailed description of the latter will apply as well to the former.

In its operational setting the fitting 12 is mounted on the end region 11a of the torsion tube 11, with the web 14 bridging the open end of the tube, and with the internally cylindrical coupling sleeve section 13a being disposed in closely surrounding relation to a circumferentially continuous thin layer 18 of elastomeric material, e.g. a suitable polyurethane or cis-polybutadiene composition, which is cemented by an adhesive, e.g. a suitable epoxy resin composition, to the outer surface of the end region of the torsion tube. The elastomer layer 18 is of uniform thickness throughout its entire expanse. A substantially coextensive circumferentially continuous thin layer 19 of preferably the same elastomeric material is similarly cemented to the inner surface of the torsion tube end region 11a. The thickness of the inner elastomer layer 19 gradually increases, however, from one end thereof to the other and in the direction away from the web 14 and the proximate open end of the torsion tube. The layer 19 occupies the correspondingly shaped annular space defined between the inner surface of the torsion tube 11 and an interiorly disposed radially expansible means for generating the clamping forces required to connect the tube 11 and fitting 12 to one another secure against slippage.

Figure 8:
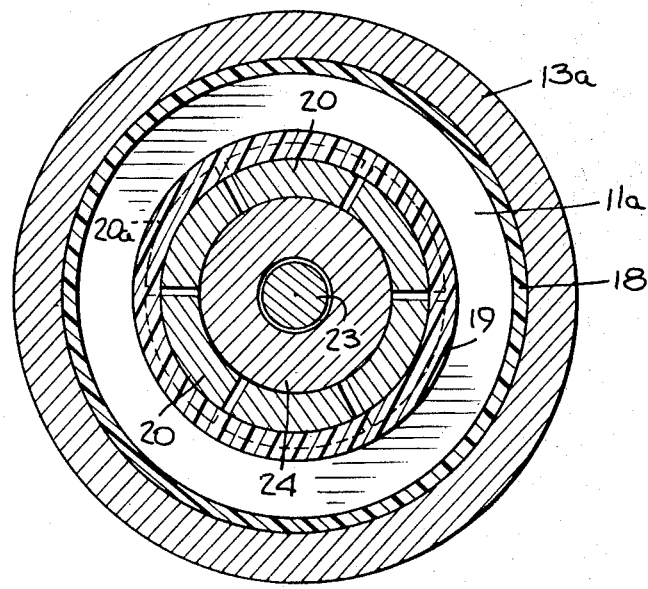
FIG. 8 is a sectional view taken along the line 8-8 in FIG. 3.

In the illustrated embodiment of the invention, the said expansible means is in the form of a longitudinally split tubular structure having conical inner and outer surfaces and constituted by a circumferential arrangement of a plurality of elongated rigid metal wedge-shaped elements 20 of circularly accurate cross section (see FIGS. 4 and 8) which decrease in thickness in the direction away from the web 14. At their thinnest ends the wedge elements 20 have respective radially outwardly extending shoulders or flanges 20a which together define a radially outwardly projecting end flange on the split tubular structure to provide a shoulder or abutment for the thickest end of the inner elastomer layer 19 (see FIG. 3). At their thickest ends the wedge elements are provided with axial tapped holes 20b, and the web 14 in the coupling sleeve 13 is provided with a corresponding number of circumferentially uniformly distributed openings 21. The wedge elements are secured to the web 14 by means of respective bolts or screws 22 the heads of which are located at the outer side of the web in sliding surface contact therewith and the threaded ends of the shanks of which are screwed into the holes 20b of the wedge elements. As shown in FIGS. 4, 5 and 6, the openings 21 are preferably in the form of radial slots of generally rectangular shape, their widths being greater than the diameters of the screw shanks to an extent sufficient to permit sliding movement of the latter therein, and the slot lengths being somewhat greater than the respective screw shank diameters to an extent sufficient to permit a limited degree of radial movement.

Coaxially arranged with respect to the set of wedge elements 20 is a draw rod 23 having a conical body section 24 which increases in thickness in the direction away from the web and is located in the conical space defined interiorly of the tubular structure constituted by the wedge elements. In the illustrated construction, the body section 24 of the draw rod is in the form of an externally conical tube mounted on the draw rod 23 in end abutting relation to the head 23a of the latter and secured in place in any suitable manner, e.g. by a set screw (not shown), but it will be understood that the entire draw rod could be an integral or unitary structure machined to shape, for example, if desired. The draw rod has a threaded end section 23b which extends through an axial bore 25 in the web 14, and a nut 26 is threaded onto the draw rod section 23b within the confines of the coupling sleeve section 13b. The nut bears against the web 14 so that, upon appropriate rotation of the nut while the draw rod is held against rotation, the conical section thereof can be pulled toward the web to effect the clamping operation.

In the use of the torque transmission system 10, the end region 11a of the torsion tube 11, together with the elastomer layers 18 and 19 carried thereby, is initially telescoped into the annular space defined between the inner cylindrical surface of the coupling sleeve section 13a and the outer conical surface of the split tubular structure defined by the wedge elements 20. The various parts of the fitting at that time are in the positions thereof shown in FIGS. 3 and 5. The conical section 24 of the draw rod is then pulled axially toward the web 14 of the coupling sleeve, for example by rotating the nut 26 while clamping the draw rod in any suitable manner to hold the latter against rotation, to effect a slight radially outward displacement of the wedge elements toward the coupling sleeve, sufficient to bring the parts to the positions thereof shown (to a somewhat exaggerated extent) in FIGS. 6 and 8. As a result, the tube wall is firmly clamped against the coupling sleeve via the elastomer layers 18 and 19.

The section 13b of the coupling sleeve 13 of the fitting 12 and the socket end 17 of the drive member or power shaft 16 are then telescoped one into the other. Upon rotation of the drive member, therefore, torque will be transferred into the torsion tube simultaneously via both the outside and inside surfaces thereof, the line of action in the one case being from the socket 17 via the coupling sleeve section 13b directly to the coupling sleeve section 13a and thence via the outer elastomer layer 18 to the outside tube surface, and in the other case being independently thereof from the socket 17 via the coupling sleeve section 13b directly to the web 14 and hence via the bolts 22, the wedge elements 20 and the inner elastomer layer 19 to the inside tube surface. The elastomer layers must, of course, have properties adequate to compensate for the differential strains between the metal parts of the fitting and the filamentary reinforcement of the resin torsion tube resulting from the differences in the elongation properties of the respective materials, and also to assure a distribution of the stress transfer over the entire expanse of the clamped end region of the torsion tube. For example, in the case of a 1 inch diameter filament-wound glass fiber and epoxy resin tube, a thickness of 0.006 inch may be used for the outer elastomer layer, and a thickness of 0.006 inch at the thinnest end and not more than 10 times that at the thickest end for the inner elastomer layer. For larger tubes, the layer thicknesses would have to be increased in proportion to the increase in diameter.

The present invention thus makes it possible to use straight-surfaced fiber-reinforced resin tubes of uniform wall thickness as torque transmitting members, by virtue of the fact that the presence of the inner and outer elastomer layers on the tube surfaces in conjunction with the transfer of stress into the tube simultaneously via both surfaces serves to prevent stress concentrations and eliminates the need for increasing the tube end wall thickness so as to compensate for such stress concentrations, which not only prolongs the useful service life of the tube but increases its torque capability as well.

As will be readily apparent, the principles of the present invention are applicable to the transmission of other types of forces than torque, e.g. bending, pushing and pulling forces. In any such system, however, some slight modification of certain structural elements of the clamp fitting may be required. Merely by way of example, for the transmission of pulling or bending forces, the coupling sleeve section 13b and the socket 17 would have to be bolted or screwed or otherwise axially nonslidably locked together, rather than being interlocked by means of a "hex" or splined connection.

It will be understood that the foregoing description of preferred embodiments of the present invention is for purposes of illustration only, and that the various structural and operational features and relationships herein disclosed are susceptible to a number of modifications and changes none of which entails any departure from the spirit and scope of the present invention as defined in the hereto appended claims.

I claim:

1. A force transmitting system, comprising a cylindrical, open-ended, fiber-reinforced resin tube having a pair of substantially coextensive, circumferentially continuous layers of elastomeric material bonded to respective mutually overlying regions of the inner and outer tube surfaces, the outer one of said layers being of uniform thickness throughout its expanse, and a force transferring fitting having external rigid sleeve means and concentric internal radially expansible means defining an annular space about the latter in which the portion of said tube carrying said elastomer layers is received, said tube being clamped to said fitting by activation of said expansible means to press said tube outwardly via said elastomer layers against said sleeve means.

2. A force transmitting system, comprising a cylindrical, open-ended, fiber-reinforced resin tube having first and second substantially coextensive, circumferentially continuous layers of elastomeric material bonded to respective mutually overlying regions of the inner and outer tube surfaces, said first layer being of increasing thickness in the direction away from the proximate open end of said tube, said second layer being of uniform thickness throughout its expanse, and a force transferring fitting having external rigid sleeve means and concentric internal radially expansible means defining an annular space about the latter in which the portion of said tube carrying said elastomer layers is received, said tube being clamped to said fitting by activation of said expansible means to press said tube outwardly via said elastomer layers against said sleeve means.

3. A force transmitting system according to claim 2, wherein the thickness of said first layer increases from a minimum value substantially equal to the thickness of said second layer, to a maximum value of no more than about 10 times the minimum value.

4. A force transmitting system, comprising a cylindrical, open-ended, fiber-reinforced resin tube, first and second substantially coextensive, circumferentially continuous layers of elastomeric material bonded to respective mutually overlying regions of the inner and outer surfaces of said tube, said first layer being of increasing thickness in the direction away from the proximate open end of said tube, said second layer being of uniform thickness throughout its expanse, a rigid metal tubular coupling sleeve with a cylindrical inner surface disposed in surrounding relation to the outer surface of said second elastomer layer, radially expansible means located interiorly of said tube and said first elastomer layer for applying outwardly directed pressure to said tube in the region of said elastomer layers and clamping said tube to said coupling sleeve via said elastomer layers, means for selectively activating said expansible means, and means for enabling establishment of a joint driving connection between force applying means and both said expansible means and said coupling sleeve, whereby upon expansion of said expansible means, force may be transferred by said coupling sleeve and said second elastomer layer to the outer surface of said tube, and simultaneously but independently thereof by said expansible means and said first elastomer layer to the inner surface of said tube, said elastomer layers ensuring a distribution of stress transfer to said tube over the entire expanse of said overlying regions of said tube surfaces.

5. A force transmitting system according to claim 4, said means for enabling said driving connection to be established comprising a rigid metal transverse web interiorly of said coupling sleeve and dividing the latter into first and second sections, said first section having said cylindrical inner surface, said web bridging the proximate open end of said tube, means securing said web and said expansible means to one another, and means on said second section of said coupling sleeve adapted to coact with corresponding means on said force applying means for interlocking said coupling sleeve and said force applying means against displacement relative to one another in the direction of the force to be transmitted.

6. A force transmitting system according to claim 5, said interlocking means comprising an external splined configuration of said second section of said coupling sleeve.

7. A force transmitting system according to claim 5, said interlocking means comprising an external hexagonal configuration of said second section of said coupling sleeve.

8. A force transmitting system according to claim 5, said interlocking means comprising an external threaded configuration of said second section of said coupling sleeve.

9. A force transmitting system, comprising a cylindrical, open-ended, fiber-reinforced resin tube, first and second substantially coextensive, circumferentially continuous layers of elastomeric material bonded to respective overlying regions of the inner and outer surfaces of said tube, said first layer increasing in thickness in the direction away from the proximate open end of said tube, said second layer being of uniform thickness throughout its expanse, a rigid metal tubular coupling sleeve having an integral, internal, rigid transverse web intermediate its ends, a first section of said coupling sleeve to one side of said web having a cylindrical inner surface and being disposed in surrounding relation to the outer surface of said second elastomer layer and with said web overlying said open end of said tube, a second section of said coupling sleeve to the other side of said web being provided with means adapted to enable the output end of a driving member, when the same is juxtaposed to said second section of said coupling sleeve, to be drivingly connected to the same, said web being provided with an axial opening and with a set of additional openings arranged along a locus concentric with said axial openings, a plurality of elongated wedge-shaped elements of circularly arcuate cross section extending axially along and in side-by-side configuration interiorly of said tube and said first elastomer layer, said elements decreasing in thickness in the direction away from said open end of said tube and conjointly defining a split tubular structure having a conical exterior configuration which decreases in diameter in the direction away from said web and having a conical internal space which decreases in diameter in the direction of said web, each of said elements at its thickest end slidably engaging said web, each of said elements at its end facing said web having secured thereto a shank of a headed bolt extending with a degree of freedom of radial movement through a respective one of said additional openings in said web, each of said elements having a radially outwardly extending flange at its thinnest portion to a height insufficient to reach the inner tube surface, said first elastomer layer occupying the entire space between said inner tube surface and said split tubular structure intermediate said flanged and thickest ends thereof, a draw rod having a conical body section arranged coaxially within the confines of said conical internal space of said split tubular structure and having its widest portion juxtaposed to the thinnest portions of said elements, said draw rod including an externally threaded end section extending axially from the narrowest portion of said conical body section through the space within the confines of said thickest portions of said elements and through said axial opening in said web, and a nut threaded on said end section of said draw rod within the confines of said second section of said coupling sleeve and bearing against said web to enable said conical body section of said draw rod, upon rotation of said nut in the appropriate direction, to be pulled toward said web for displacing said elements radially outwardly against said first elastomer layer to an extent sufficient to clamp said tube tightly against said first section of said coupling sleeve via said first and second elastomer layers, whereby force may be transmitted via said second section of said coupling sleeve to said first section thereof and thence via said second elastomer layer to the outer surface of said tube, and independently thereof via said second section of said coupling sleeve to said web and thence via said elements and said first elastomer layer to the inner surface of said tube, said elastomer layers ensuring a distribution of stress transfer to said tube over the entire axial length of said overlying regions of said tube surfaces.

10. A force transmitting system according to claim 9, wherein the thickness of said first elastomer layer increases from a minimum value substantially equal to the thickness of said second elastomer layer, to a maximum value of no more than about 10 times the minimum value.

11. A clamp fitting for a force transmitting system wherein a cylindrical, open-ended tube is used as the force transmitting member, said fitting comprising a rigid metal tubular coupling sleeve having an internal rigid transverse web dividing said coupling sleeve into first and second sections, said first section of said coupling sleeve being provided with a cylindrical inner surface, said web being provided with an axial opening and with a plurality of additional openings spaced circumferentially therearound, a plurality of elongated wedge-shaped elements of circularly arcuate cross section extending axially along and in side-by-side configuration interiorly of said first section of said coupling sleeve, said elements decreasing in thickness in the direction away from said web and conjointly defining a split tubular structure having a conical exterior configuration which decreases in diameter in the direction away from said web and a conical internal space which increases in diameter in the direction away from said web, said second section of said coupling sleeve and said tubular structure defining therebetween an annular space adapted to receive the open end region of said tube, each of said elements at its thickest portion being radially slidably secured to said web at a respective one of said additional openings so as to be restrained against displacement relative to said web in the direction of the force to be transmitted, a draw rod having a conical body section arranged coaxially within the confines of said conical space and having its widest portion juxtaposed to the thinnest portions of said elements, said draw rod including an externally threaded end section extending through the space within the confines of said thickest portions of said elements and through said axial opening in said web, and a nut threaded on said end section of said draw rod at the side of said web within the confines of said second section of said coupling sleeve and bearing against said web to enable said conical body section of said draw rod, upon rotation of said nut relative to said draw rod in the appropriate, direction to be pulled toward said web for displacing said elements radially outwardly toward said coupling sleeve, whereby upon application of said force to said second section of said coupling sleeve, stress can be transferred simultaneously but independently into the inside and outside surfaces of a tube clamped between said coupling sleeve and said elements.

12. A clamp fitting according to claim 11, said second section of said coupling sleeve having an external splined configuration adapted to coact with a corresponding internal configuration of a force applying means.

13. A clamp fitting according to claim 11, said second section of said coupling sleeve having an external hexagonal configuration adapted to coact with a corresponding internal configuration of a force applying means.

14. A clamp fitting according to claim 11, said second section of said coupling sleeve having an external threaded configuration adapted to coact with a corresponding internal configuration of a force applying means.

15. A clamp fitting for a force transmitting system wherein a cylindrical, open-ended, fiber-reinforced resin tube is used as the force transmitting member, said fitting comprising a rigid metal tubular coupling sleeve having an internal rigid transverse web dividing said coupling sleeve into first and second sections, said first section of said coupling sleeve being provided with a cylindrical inner surface, said web being provided with an axial opening and with a plurality of additional openings spaced circumferentially therearound, a plurality of elongated wedge-shaped elements of circularly arcuate cross section extending axially along and in side-by-side configuration interiorly of said first section of said coupling sleeve, said elements decreasing in thickness in the direction away from said web and conjointly defining a split tubular structure having a conical exterior configuration which decreases in diameter in the direction away from said web and a conical internal space which increases in diameter in the direction away from said web, said second section of said coupling sleeve and said tubular structure defining therebetween an annular space adapted to receive the open end region of said tube, a pair of substantially coextensive, circumferentially continuous layers of elastomeric material adapted to be bonded to respective overlying regions of the inner and outer surfaces of said tube, that one of said layers to be the outer layer being of uniform thickness throughout its expanse, the other layer being of increasing thickness from one end thereof to the other, each of said elements at its thickest portion being slidably secured to said web at a respective one of said additional openings so as to be restrained against displacement relative to said web in the direction of the force to be transmitted, each of said elements having a radially outwardly extending flange at its thinnest portion to a height insufficient to reach the inner tube surface when a tube is received in said annular space, a draw rod having a conical body section arranged coaxially within the confines of said conical space and having its widest portion juxtaposed to said thinnest portions of said elements, said draw rod including an externally threaded end section extending through the space within the confines of said thickest portions of said elements and through said axial opening in said web, and a nut threaded on said end section of said draw rod within the confines of said second section of said coupling sleeve and bearing against said web to enable said conical body section of said draw rod, upon rotation of said nut relative to said draw rod in the appropriate direction, to be pulled toward said web for displacing said elements radially outwardly toward said coupling sleeve, whereby upon application of said force to said second section of said coupling sleeve, stress can be transferred simultaneously but independently into the inside and outside surfaces of a tube clamped between said coupling sleeve and said elements, said elastomer layers being effective to distribute the stress transfer over the entire expanse of the clamped region of said tube.

16. A clamp fitting according to claim 15, said second section of said coupling sleeve having an external splined configuration adapted to coact with a corresponding internal configuration of a force applying means.

17. A clamp fitting according to claim 15, said second section of said coupling sleeve having an external hexagonal configuration adapted to coact with a corresponding internal configuration of a force applying means.

18. A clamp fitting according to claim 15, said second section of said coupling sleeve having an external threaded configuration adapted to coact with a corresponding internal configuration of a force applying means.

19. A clamp fitting according to claim 15, the thickness of said other layer increasing from a minimum value substantially equal to the thickness of said one layer, to a maximum value of no more than about 10 times the minimum value.